(12) United States Patent
Bogatin

(10) Patent No.: US 8,634,853 B2
(45) Date of Patent: Jan. 21, 2014

(54) METHOD FOR ENHANCING LOCATION IDENTITY THROUGH INCORPORATION OF SHORTER-RANGE COMMUNICATION AND SENSING (NEARLOCATE)

(75) Inventor: Boris Bogatin, Huntingdon Valley, PA (US)

(73) Assignee: NearVerse, Inc., Huntingdon Valley, PA (US)

( * ) Notice: Subject to any disclaimer, the term of this patent is extended or adjusted under 35 U.S.C. 154(b) by 0 days.

(21) Appl. No.: 13/318,928

(22) PCT Filed: May 4, 2010

(86) PCT No.: PCT/US2010/033598
§ 371 (c)(1),
(2), (4) Date: Nov. 4, 2011

(87) PCT Pub. No.: WO2010/129589
PCT Pub. Date: Nov. 11, 2010

(65) Prior Publication Data
US 2012/0052884 A1   Mar. 1, 2012

Related U.S. Application Data

(60) Provisional application No. 61/175,106, filed on May 4, 2009.

(51) Int. Cl.
*H04W 24/00* (2009.01)
(52) U.S. Cl.
USPC ... 455/456.1; 455/41.2; 455/41.3; 455/456.2; 455/456.3; 455/456.5; 455/404.1; 455/456.6; 455/457; 455/550.1; 455/552.1; 455/553.1; 370/310.2; 370/328; 370/338

(58) Field of Classification Search
USPC .......... 455/456.1–457, 41.2, 41.3, 404.3, 455/550.1, 552.1, 553.1; 370/310.2, 328, 370/338
See application file for complete search history.

(56) References Cited

U.S. PATENT DOCUMENTS

| | | | |
|---|---|---|---|
| 6,826,162 B2 | 11/2004 | Haines et al. | |
| 7,509,131 B2 | 3/2009 | Krumm et al. | |
| 7,554,965 B2 * | 6/2009 | Karaoguz | 370/342 |
| 7,970,419 B2 * | 6/2011 | Oh et al. | 455/457 |
| 8,019,692 B2 * | 9/2011 | Rosen | 705/319 |
| 8,073,390 B2 * | 12/2011 | Jendbro et al. | 455/41.2 |
| 8,082,303 B2 * | 12/2011 | Laroia et al. | 709/204 |
| 8,169,933 B2 * | 5/2012 | Srinivasan et al. | 370/253 |
| 2004/0027283 A1 * | 2/2004 | Dooley et al. | 342/458 |
| 2005/0221813 A1 * | 10/2005 | Rajahalme et al. | 455/422.1 |
| 2006/0148522 A1 * | 7/2006 | Chipchase et al. | 455/557 |
| 2007/0121560 A1 * | 5/2007 | Edge | 370/338 |
| 2008/0133126 A1 | 6/2008 | Dupray | |
| 2009/0075675 A1 * | 3/2009 | Kim et al. | 455/456.2 |
| 2009/0104889 A1 * | 4/2009 | Lotvonen et al. | 455/410 |
| 2009/0160711 A1 * | 6/2009 | Mehta | 342/450 |

* cited by examiner

*Primary Examiner* — Steve D Agosta
(74) *Attorney, Agent, or Firm* — Volpe and Koenig, P.C.

(57) ABSTRACT

A method of determining location of a mobile device including estimating an absolute location using long range communication estimates, estimating a relative location based on shorter-range communications, receiving location information from a plurality of peer entities, and refining the absolute location and based on the received location information.

22 Claims, 13 Drawing Sheets

METHOD FOR ENHANCING LOCATION IDENTITY THROUGH INCORPORATION OF SHORTER-RANGE COMMUNICATION AND SENSING (NEARLOCATE)

CROSS REFERENCE TO RELATED APPLICATION

This application claims the benefit of U.S. Provisional Application No. 61/175,106, filed May 4, 2009, which is incorporated by reference as if fully set forth.

BACKGROUND

Current network-based techniques for determining user location include tower-based triangulation, multilateration of the angles or times of arrivals of wireless terminal signals, signal strength based estimations, GPS-based techniques, and SkyHook/Polaris wireless techniques of estimating the signal environment of base stations and Wi-Fi points within a given area, including such signals' fading conditions.

However, methods are desired which allow the use of devices and known information about the local environment, to cross-reference with network-based information.

SUMMARY

A method of determining location of a mobile device including estimating an absolute location using long range communication estimates, estimating a relative location based on shorter-range communications, receiving location information from a plurality of peer entities, and refining the absolute location and based on the received location information.

A method for reverse trilateration including receiving absolute and relative location estimates from a plurality of peer entities, correlating the received absolute and relative location estimates to generate a refined absolute location estimate, receiving refined absolute location estimates from the plurality of peer entities, and trilaterating the received absolute location estimates along with the generated absolute location estimates to determine a location of a network point.

BRIEF DESCRIPTION OF THE DRAWINGS

A more detailed understanding may be had from the following description, given by way of example in conjunction with the accompanying drawings wherein.

DETAILED DESCRIPTION

Precise location determination may be challenging to implement in in-building environments because of a) GPS signal not accurately reaching in-building, and b) the sources of RF signal reference are very distant, and the in-building obstruction substantially undermines their ability for precise performance. The embodiments described herein cover a more effective methods for such precise measurements, by using relationships between the sources of RF signal reference, and other sensing capability, that are often in high proximity to each other. The embodiments described herein may further enhance such precision, by correlating these short-range relationships to each other and to long-range measurements determined through GPS-derived methods and from network triangulation (time difference of arrival (TDOA)). The embodiments may further enhance such precision by correlating these short-range relationships, through meshing or nesting, to a certain object that has precise Location Identity due to such object's location in a favorable environment. The embodiments described herein may enhance such precision by correlating these short-range relationships to maps/blueprints of the actual physical spaces where the objects are likely located. The embodiments described herein further enhance such precision by refining any given object's Location Identity, by sensing their proximity to nearby objects matched to other pre-determined data on such nearby objects' location (i.e. such nearby object as a support column, such sensing as a photograph, and such matching as a reference of the photograph against a database of photographs for the location in question).

Figure 1:
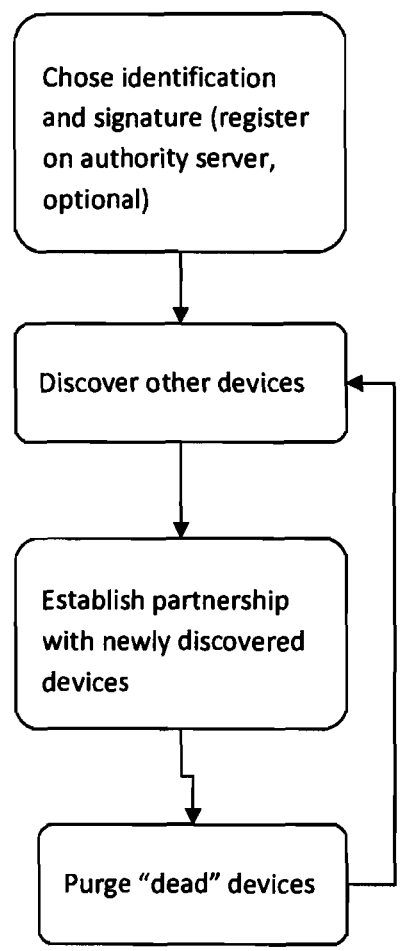
FIG. 1 shows an initialization procedure performed by a NearLocate enabled device.

FIG. 1 shows an initialization procedure performed by a NearLocate enabled device. The device selects an identification and a signature; this may be performed by registering on an authority server. Then a discovery process is initiated to discover other devices accessible within a predetermined proximity. A partnership is established with the discovered devices. The NearLocate enabled device then purges its list of accessible devices by removed "dead" devices. NearLocate enabled devices use the partnerships with other devices to enhance location determination for it and the other devices.

NearLocate devices communicate two basic kinds of location information, relative location (information regarding their peer relative position), and absolute location information.

NearLocate devices may be configured to enhance location identity using shorter-range communication and sensing. At least three devices, (e.g. two smartphones and a Wi-Fi access point) form a partnership that communicates with each other.

Each device initiates an absolute location estimation procedure. In a first embodiment, the absolute location estimate is determined using a form of long range communication. This may be performed, for example using GPS or AGPS or by requesting information from a cellular network. Additionally, because a Wi-Fi access point may also be a fixed location, the device may estimate its absolute location based on a communicating Wi-Fi access point.

Alternatively, the device may use physical data capture for absolute location estimation. Physical data capture uses information about the environment that may be dynamically captured (i.e. photo capture, audio capture, user input). The physical data is compared against a database of known locations to determine an absolute location estimate of the device.

After determining a first estimated absolute location, each device then determines a relative location. Relative location estimates may be determined using short-range communications methods or through direct interfaces with other enabled peer devices. For example, relative location may be estimated using trilateration. Multilateration may also be used, wherein the location of a devise is determined based on the time difference of arrival (TDOA) of a signal emitted from that object to three or more receivers. Each device may perform measurements on received signals between each of the devices. Each device transmits an information element including the power level and RF characteristics being transmitted. The attenuation of the signal is calculated, incorporating any known additional fading or blockages which contribute to the attenuation, and the transmission distance is then estimated. Alternatively, using TDOA, a device may determine that a NearLocate enabled peer that returns an acknowledgement signal in the least amount of time is the closest peer.

Alternatively, phase measurements of signals locked in phase to a source carrier may be used to further refine information regarding the source of the signal and generating location estimates.

After capturing the information, the device converts the relationship information of the partner devices into a "likelihood representation" of the physical relationships of the devices.

Each device then shares its own likelihood representation, wherein the peer positions are correlated with the absolute positions to refine the accuracy of the target device as well as the peer devices.

Because the location information determined using the above cited methods may be imprecise, a probability distribution map is generated mapping potential locations for each device. The location estimates determined by the device (absolute and relative location) is correlated with peer estimates as well as network estimates. The probability distribution map generates a mean value location for each peer device as well as variance values.

The geometric mean of the locations determined by each device is evaluated and a vector translation of each of location estimate derived from inertial navigation system are vectorially translated in this geometric mean position, which provides a set of absolute location values that are clustered around the true position of the device by plotting a probability distribution with mean and variance for absolute position of each device.

The absolute location of each device may be enhanced by plotting the probability distribution with mean and variance for relative position of each device and that of the partnership. The distribution is correlated with information from other devices and plotting a new probability distribution with new mean and variance for refined absolute location estimate. As will be described in greater detail hereafter, absolute location estimates from multiple different carriers and devices in a given area (i.e. SkyHook, AT&T, Verizon, cell ID, etc.), are also used and refined. Correlation of uncorrelated, diversified results, improves the readings.

In some instances, absolute location may not be necessary, for example, and the device may use only the relative location with other devices in its estimates.

If a device is unable to determine its own absolute position, then it may receive the information from peers that have absolute location information. This may enable a device indoors or not equipped with a GPS feature to accurately estimate its absolute location.

Each peer may be assigned a precision factor for its location estimates. The precision factor may account for reflects the accuracy of a devices location estimates based on the devices ability to determine such estimates. For example, the precision factor of a relative location estimate may be higher when a device has line-of-sight communication with the peer entity and lower when it is through a wall. The precision factor may be adjusted based on the uncertainty of the position of a peer, uncertainty of a distance estimate between a peer and master, and the elapsed time after the measurement of a peer. Additionally, the precision factor may account for the accuracy of the peer devices previous measurements. For example, the precision factor may be adjusted by comparing the signaled absolute location of the peer device with a calculated location of the peer device based on the determined relative locations of the two devices. Based on a device's determined precision factor, each location signal provided by that device is weighted. If a device consistently indicates that it is in an area determined to be a low probability point, (i.e. the difference between the probable location of the device and the signaled location is above a predetermined threshold), the peer device is assigned a poor rating and the information provided is given a lower weight in determining the location of other peer devices.

The precision factor is a dynamically calculated value associated with each device, which measures how precise the current location estimation is. The precision factor may account for the following: the uncertainty of a peer's absolute position, the uncertainty of distance between peer and the device; the current/stale position; whether a device is fixed or mobile device, the track record in estimation of a precise absolute/relative location, environmental and other situational factors that may define a given device as more or less reliable, prediction of a device's location, based on a prior record, but with a degradation of its precision now, and/or a number of iterations of its location improve precision, as long as the device is suspected to be fixed NearLocate enabled devices may perform continuous refinement of precision for all the devices participating. The following terms may be used in precision and rating.

When referred to hereafter, the term "desired precision $\mu$" includes but is not limited to a range of accuracy that location has to be estimated within. This value is predefined constant for each device. For instance, desired precession 2 meters means that the system via multiple iterations has to achieve the state when all the location estimation is within 2 meters range from the actual device locations.

When referred to hereafter, the term "measure validity coefficient" includes but is not limited to the relative period of time when a measure is valid. Measure validity period may vary according to measure and device type. Wherein the following value is used:

$$\lambda = \text{(time elapsed since measure/measure validity period)}.$$

A measure taken a longer time ago may be invalid, due to dynamical changes of devices statuses and locations.

When referred to hereafter, a device is said to be dead if it fails to respond during a predefined aliveness period. Alternatively, regularly responding devices are called alive.

In addition to the precision factor, a rating is determined for each device. A rating is defined dynamically for each device, and measures how consistent location of the device is. The principal difference between these two values is that precision factor is a value calculated by each device by itself, when rating is evaluated dynamically for each device by the participants of NearLocate network.

Devices may have an inaccurate estimation with an acceptable precision factor or some devices may be acting maliciously. To reduce the influence of the devices, each rating may be evaluated by other devices and therefore the rating will be low for the incidental device.

A heuristic approach may be used to calculate these values. The heuristic approach may take into account the following parameters:

a. uncertainty of peer's absolute position;
 b. uncertainty of distance between peer and the device;
 c. current/stale position;
 d. track record in estimation of a precise position;
 e. environmental and other situational factors that may define a device as more or less reliable;
 f. prediction of a device's location, based on a prior record, but with a degradation of its precision now—so suspected accuracy of location ID here based on prediction; and
 g. number of iterations of its location improve precision, as long as the device is suspected to be fixed.

In estimating partner consistency, let i and j be two devices, having estimated locations and distance between them. Denote by d' the distance between estimated locations and by d" the measured distance between this devices. Also denote by $\delta_i, \delta_j$ the correspondent deviations. The partner consistency function may be defined as follows:

$$S(i, j) = \underbrace{\lambda(d'')}_{\text{measure validity factor}} \underbrace{(\log_\eta(\eta + |d' - d''|))^{-p_1}}_{\text{absolute inconsistency factor}} \underbrace{\sqrt[p_2]{1 - \frac{|d' - d''|}{d' + d''}}}_{\text{relative inconsistency factor}}$$

Where $p_1, p_2 \geq 1$ are predefined constants. Partner consistency may be the base rating measure demonstrating how the distance between two devices based on their location estimation fits the distance measured between them. This function merges values, depending on the time of measurement, desired precision and the distance mismatch. This function obtains values in the interval [0,1], where value 1 means that the measure is consistent.

The Precision factor of device i may be calculated as an average of all partner consistency measurements and defined as follows:

$$P_i = \frac{1}{v} \sum_j S(i, j).$$

Where v is the total number of adjacent devices that device i have partner consistency measured with.

For each NearLocate device i the rating function may be determined as follows:

$$R_i = \frac{v'}{v' + M} \cdot (\lambda(r) + C).$$

Where v' is the number of devices which have rated device i, M is minimal number of devices required for valid rating estimation, $$r = \frac{1}{v} \sum_j S(i, j)$$

is the average of all consistency estimations (similarly to precision factor, but is calculated by other nodes) and C is global average rating.

Note, that all calculation provided refer to the alive nodes: rating and precision factor of dead nodes are 0.

The precision factor for a device may also consider a characterization for each device, for example, the level of mobility of the device. A fixed station would have a higher precision factor than a mobile phone, for example. Each device generates a precision factor for each peer device and stores this information in a database that is periodically updated. Based on this information, the device may generate a rating for each device.

Because devices may have incorrect location estimation or may act maliciously, verification is performed to determine whether the rating a device receives corresponds to their location deviation and precision factor. In some conditions the mismatch may not be determinable by a simple comparison between these values. Consider set of points $(r_i, p_i)$ where $r_i$ denotes the rating of devices i and $p_i$ denotes the precision factor of this device. Furthermore, methods of the linear regression determine the best fitting line (in terms of least squares function) and the confidence half interval. The devices having their values below the line and out of this interval are considered as devices providing wrong estimations. Using this approach, inconsistencies between precision and deviation estimation may be determined. Partners may be changed if an existing partner is found to be inconsistent when it's rating not suitable for precision factor and deviation estimation.

When calculations occur, reference points of devices that have higher ratings and precision factor may be used with highest priority in the calculation equation. For example, trilateration to a fixed Wi-Fi point, with a high precision rating (because its location has been determined precisely) may be rated higher than trilateration to three other mobile devices, with very low precision ratings since they are constantly moving.

Figure 2:
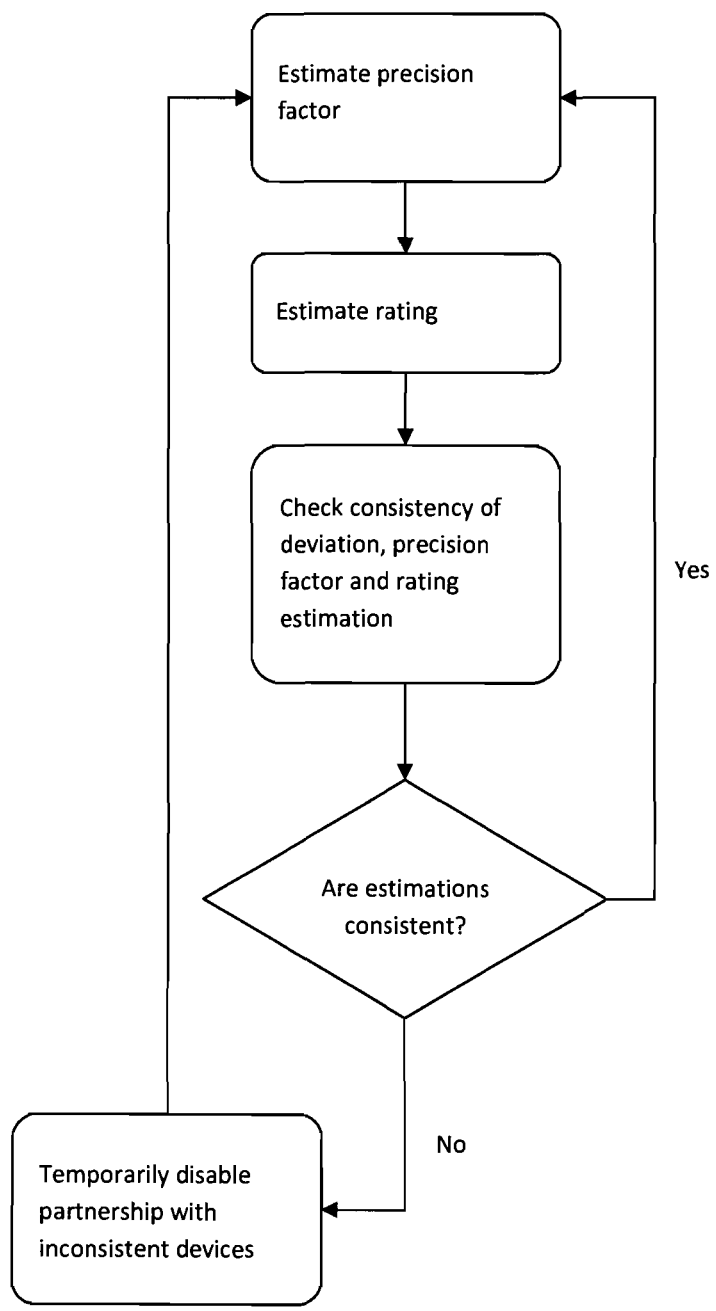
FIG. 2 is a flow diagram for refining measurements using the precision factor and rating.

FIG. 2 is a flow diagram for refining measurements using the precision factor and rating. A device estimates a precision factor. The device then estimates a rating. The device then receives information from peers regarding the precision factor and rating of target devices. The precision factor and ratings are compared with received values along with stored historical values for consistency. If the values are consistent, they are stored and the process is repeated. If the values are inconsistent, the partnership with the inconsistent device is temporarily disabled.

The central server may receive the location information or probability distribution map along with the ratings for each device and overlay the information on physical maps stored on the server. The physical maps are used to further refine the location of peer devices. This may allow the central server to eliminate areas where probability of existence of a device is negligible (e.g. in a mountain or in the ground). The physical map may also facilitate in determining probabilistic fading for a given device. Accordingly, a revised probability distribution map is generated which is signaled back to the devices.

Each device may further signal the central server with signal strength and fading information. A database may be generated with information on signal strength/fading conditions by location. When a signal is received from a device, its signal strength is compared with the signal strengths in the database and corresponding location is obtained. The fading database may be used to refine the signal strength/TDOA interpretations of the relative distances, as fading may factor in to the accuracy of the relative distance measurement.

Each device may further comprise an accelerometer. The accelerometer may be used to track changes in the absolute location ID as well as relative location. By overlaying the accelerometer information onto the physical map, a predictive path may be determined for the device allowing the central server to suggest additional resources that may be picked up while a device is mobile.

The mapping information stored by the central server may be signaled to each device. Each devise then uses this enhanced absolute location information and relative location information and continues to request and transmit measurements to iteratively update and refine its information.

NearLocate performs location estimation with desired precision. Each NearLocate enabled device performs continuous location estimation improvement in the background. Within its lifecycle each device communicates with its neighbors, thereby measuring the distance to them. These devices may share partner consistency related information (i.e. consistency related to distance) that has been evaluated, they may also share a timestamp of the evaluation, and discovered location and measurement.

The collected measurements (e.g. including metadata and topology information) may be used in performing location estimation. Devices may then rate their partners and identify incidental estimation or malicious devices.

The following assumptions are made for a set of wireless devices distributed across local area.
- a. Devices may access GPS signaling and may estimate their location simultaneously.
- b. Devices may not be able to simultaneously discover their location (indoor or lack of GPS receiver). The devices may be mobile and fixed.
- c. The scenario when the mobile devices which do not exactly know their locations are the most significant part of the whole set of devices is possible.
- d. Pairs of devices may determine the estimated distance between them. The devices may use signal strength and time difference based techniques in performing the estimation. The device issuing signal is said to be source, and the device receiving is said to be a target.
- e. Multi-path and shadowing effects may cause inaccurate distance estimation. In addition a part of known locations may be incorrect.
- f. Devices may distribute collected information about locations.
- g. Devices may also have internet access.
- h. Distance and location measures are distributed normally Device Identification, Signatures and Partnership When referred to hereafter, the term "partner" includes but is not limited to two devices that discovered each other and may communicate and apply a distance measurement procedure.

For example, device A might have partners B, C, and D. Partnership is a symmetric relation, wherein A is also a partner of B, C, and D. Partnership is not, however, transitive, B and C need not be partners.

The number and identities of partners for a device may vary over time. Devices start with zero partners on joining and add partners to handle their current location discovery needs. As the location for a device changes, the device may add or remove partners. Each pair of partners communicates at partnership-formation time thereby discovering a distance between them. Different pairs may use different procedures for distance measurement.

Each device randomly selects a unique ID (e.g., 128 or 256 bit) and selects a pair of private/public keys. When devices communicate with each other, the identity information supplied to the partners.

For security reasons a message may be signed with a device's private key to be verified by other devices' matching public key of these devices.

The central authority server may be configured to authenticate and certify devices participating in the NearLocate network. Each device may have internet access directly or via other devices, for example as described in PCT Application PCT/US2010/031494 filed Apr. 16, 2010 titled METHOD AND APPARATUS FOR DISTRIBUTED COMMUNICATION USING SHORT RANGE AND WIDE RANGE COMMUNICATIONS, which is incorporated by reference as if fully set forth. The central authority server may also be configured to provide initial information to facilitate device discovery. The central server forms a single point of failure for identifying new partners, however does not need to maintain a permanent state and is may be replaced during bottleneck or failure.

A target device may not only draw the relative position from a source device based on its signal strength time difference of arrival (TDOA) to the source. The device may also receive a signal strength indicator from the source and compare it to measured values. The source may also relay identifying characteristics of its source signal, including the following: information on the power level/RF characteristics of the signal when it left the source, the precise time stamp of the signal as it leaves the source, other stamps (signal strength to target, relative position to other peers, peer and network location record), and characteristics to facilitate synchronizing the source and target to a common reference point for interpreting the signal strength from source to target. The source may also provide information in a signal, including a relative read on environmental conditions (i.e. attenuation), which the target device may use to refine its relative location estimate. This information may be transmitted on a signal beacon used by the target to estimate signal strength, or separately.

The signal is received by the target from the source, with the power level/RF characteristics of the signal when it left the source. The target then calculates the attenuation of the signal, incorporating any known fading or blockages which contribute to the attenuation. Then the transmission distance is estimated.

Locking devices to a common signal from a source carrier, allows measurement and organization of the relative distances of signals from a source to each target. The reference point may be precisely common and fixed. Techniques including phase measurements of signals locked in phase to a source carrier, synchronizing transmissions to a common time base reference, or pulsed/coded transmissions, may further refine the source of the signal and their characteristics.

Devices are mobile and may change locations. Thus, location estimating system distinguishes between measurement mistakes and location changes. The rating based system may face the following problem: Let M be a device with relative high (in comparison to other devices) rating. If M moves, the estimation algorithm may use M (a device with highest rating) as a reference may update the location of other devices, when the location of M will remain the same.

To detect device movement, a proactive approach for motion detection based on increase of refresh rate may be used. Given partner consistency estimated for each pair (i,j)

of adjacent devices with measured distance, the refresh probability weight may be described as follows:

$$\omega_{ij} = \frac{P_j}{1 + S(i,j)}.$$

Each time interval t (predefined) the device i has to re-measure distance to partner device j with probability $$\omega_{ij} \Big/ \sum_k \omega_{ik}.$$

Applying the policy, a "wrong" distance to a "good" device is re-measured more frequently. A large portion of non-consistent estimations will be re-measured more often thereby discovering wrong measurements with higher probability.

In addition, each device maintains the track history of its previous locations. Each location is logged with fixed time interval. Using this information, previous location information may be interpolated to find additional location estimation. Alternatively, an accelerometer may be used to detect that the location has changed. In these cases, the refresh rate may be increased to a predefined value, during the certain time period.

Multi-Trilateration Improvement Method

Figure 3:
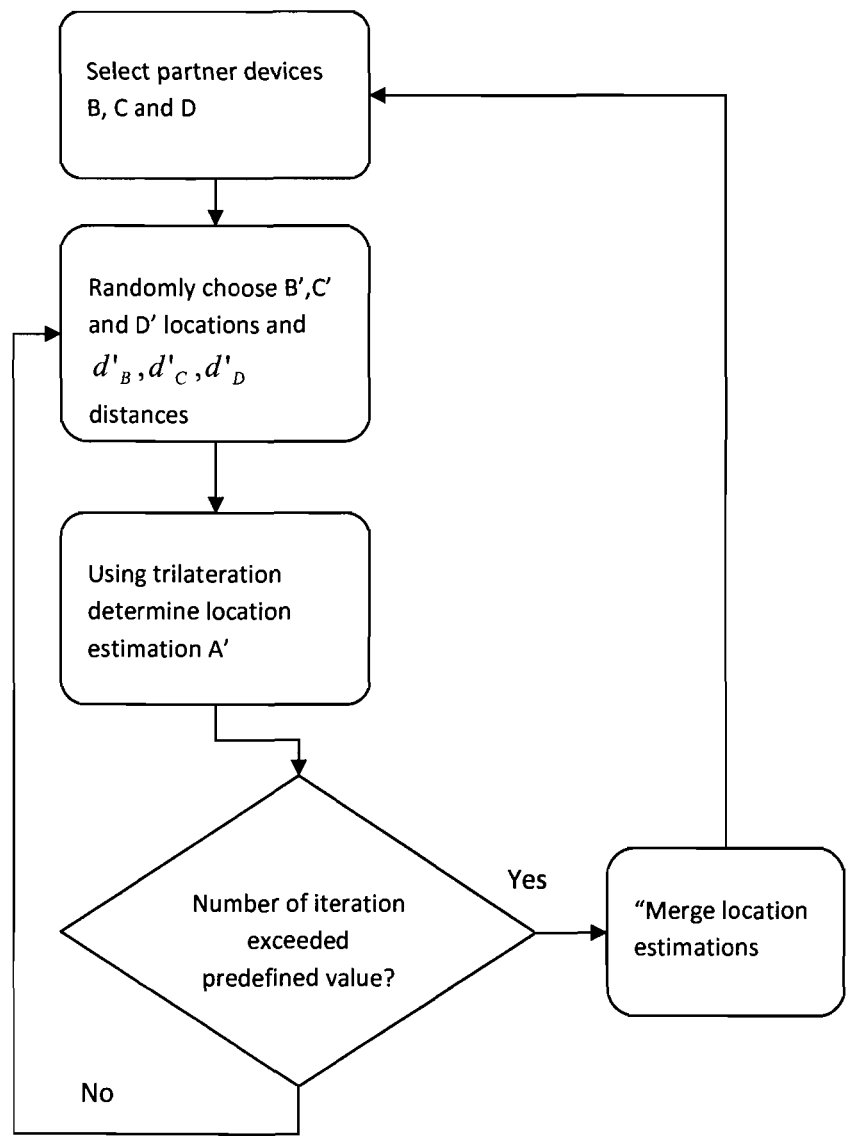
FIG. 3 is a flow diagram of a multilateration improvement procedure.

FIG. 3 is a flow diagram of a multilateration improvement procedure. Let A be a device. Denote by (X,Y,Z) estimated location (mean) of A, and let $\delta$ be the deviation and $v_0=\delta^2$ the variance. A device randomly selects partner devices B, C and D proportional to their precision factor. Let $\delta_B, \delta_C, \delta_D$ be deviation of their locations correspondently. Let $d_B, d_C, d_D$ be an estimated distances (mean) to B,C and D and $\delta_B^*, \delta_C^*, \delta_D^*$ be a correspondent deviations. The device randomly selections B', C' and D' as locations of B,C and D according to normal distribution with deviations and mean above, where $d'_B, d'_C, d'_D$ are correspondent randomly selected distances. Using trilateration, a location estimate of A' is determined. If the number of predetermined iterations of this procedure is not reached, then B', C' and D' are randomly selected again and the process repeats. Once a predetermined number of iterations is performed, the location estimations are performed and a resultant location estimate of A is determined. Repeating these steps sufficient number of times may empirically estimate the mean location of A' which is a result of a trilateration according to points B',C' and D' with distances $d'_B, d'_C, d'_D$.

Denote by (X',Y',Z') evaluated location of A' and denote by $\delta'$ and $v'$ correspondent deviation and variance. Accordingly, there may be two estimations of the location which may be merged.

Figure 4:
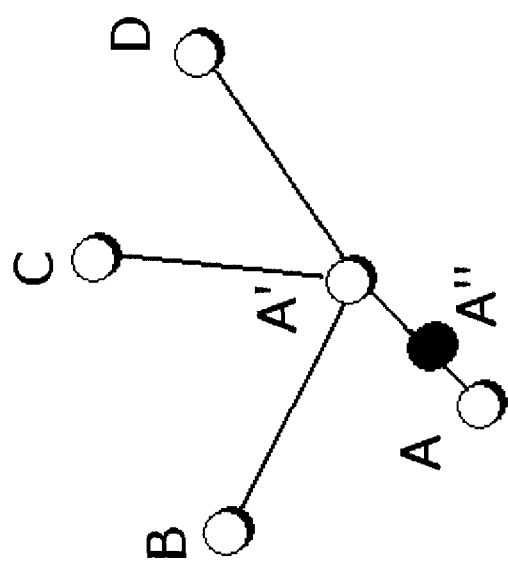
FIG. 4 illustrates a system with multi-trilateration.

FIG. 4 illustrates a system with multi-trilateration. Let $X''=\alpha X+\beta X'$, where $\alpha+\beta=1$ is a new estimation of x-axis location of first device. The values for $\alpha$, $\beta$ may be selected such that $v''=\delta''^2$ (the variance and deviation of X'') is minimized. If distributions are normal then $v''=\alpha^2 v+\beta^2 v'$. This value is minimized when $\alpha=v'/(v+v')$ and $\beta=v/(v+v')$. If $v=vv'/(v+v')<\min(v,v')$, i.e. the variance and consequently deviation are minimized and thus the position estimation may be more accurate.

In a general case, it may be assumed that there are multiple estimations of device A's location. Let $X_1, X_2, \ldots, X_n$ correspondent mean values of X axis coordinate (longitude).

Let $v_1, v_2, \ldots, v_n$ be correspondent variances. Using inductive interpolation of results above the new (improved) value of X may be defined as follows:

$$X''=\alpha_0 X+\alpha_1 X_1+\ldots+\alpha_n X_n,$$

when $\alpha_i=v_i^{-1}(v^{-1}+v_1^{-1}+\ldots+v_n^{-1})^{-1}$. This substitution leads to new variance estimation $(v^{-1}+v_1^{-1}+\ldots+v_n^{-1})^{-1}$, which is minimized.

Figure 5:
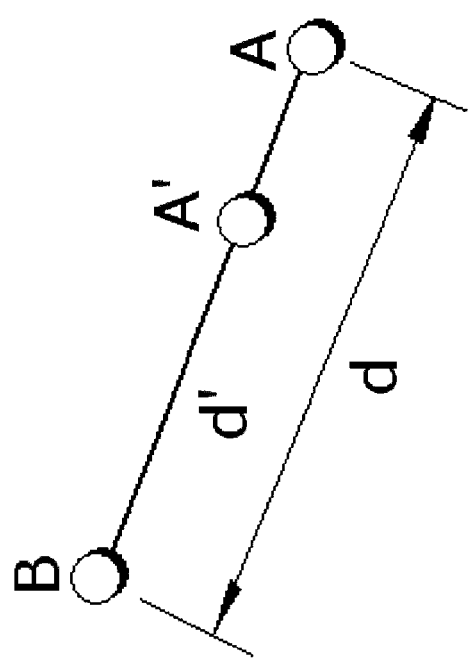
FIG. 5 illustrates a system of trilateration when the number of devices is limited.

FIG. 5 illustrates a system of trilateration when the number of devices is limited. Let A and B be two devices with measured distance d' between them. If the precision factor of A is lower than the factor of B, the device A may proceed with an improvement attempt.

If the estimated location of A is $(X_A,Y_A,Z_A)$, then $(X_B,Y_B,Z_B)$ is estimated location of B. Let d be the distance between these two estimations, i.e. $d=\sqrt{(X_A-X_B)^2+(Y_A-Y_B)^2+(Z_A-Z_B)^2}$. Let A' be the location on vector from A to B where the distance from A' to B is equal to d'.

A' is another estimation of location of A, thereby combining these two estimations may achieve improved estimation of A's location (FIG. ?).

Figure 6:
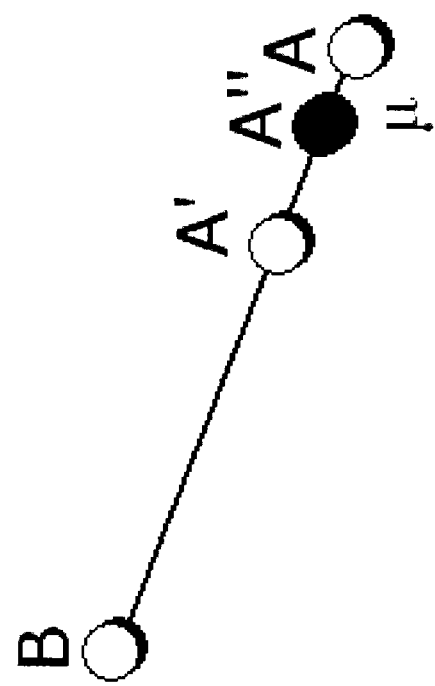
FIG. 6 illustrates an example where it may not be possible to estimate the deviation of A' is based on $\delta_A$, $\delta_B$ and $\delta_{d'}$.

FIG. 6 illustrates an example where it may not be possible to estimate the deviation of A' is based on $\delta_A$, $\delta_B$ and $\delta_{d'}$ (the deviations of A, B and d'). Accordingly, the following heuristic may be applied: A'' is selected on vector (A,A') when the distance between A and A'' is set to $k\mu$, where $\mu$ is a desired precision and $k<1$ is pre-configurable incremental factor.

Figure 7:
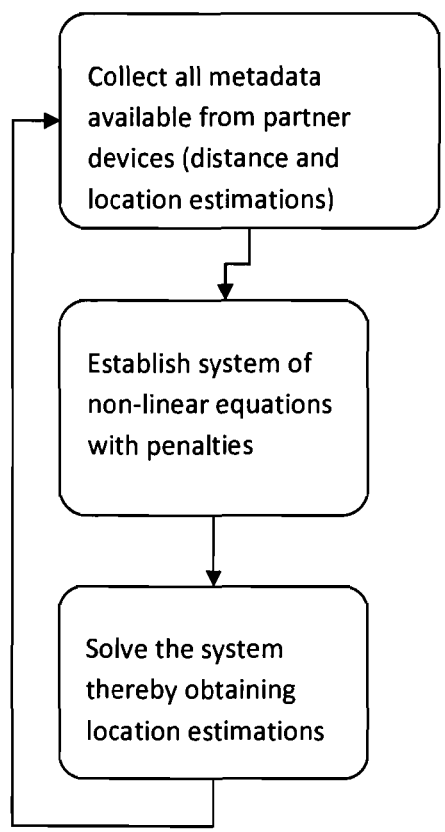
FIG. 7 is a flow diagram using a simple penalty approach.

FIG. 7 is a flow diagram using a simple penalty approach. Metadata is collected from partner devices. A system of non-linear equations with penalties is created. The device determines solutions to the system of equations using a predetermined algorithm. The resultant value will be a revised location estimate.

Location may further be established using multi-hopping between devices, where incomplete information is delivered from a device to another, but the collection of points as a group may aggregate that information, or where information is calculated and passed on to another device for its subsequent calculations with peers. In a meshed setting, where a table of absolute location IDs and relative distances, are passed on to set of devices, that calculate refined absolute location IDs and relative distances, and then pass it on to another set of devices.

Other devices may be used as for calculation assistance, which lowers the load on a device. The calculations may be distributed among the set of devices, the server, or on a cloud.

Each device analyzes collected location information which may include imprecise locations. Evaluated values corresponding to the location devices may be determined based on the estimated location to fit the estimation:

$$V_{estimated}=V_{evaluated}$$

For instance, denote by $(x_i,y_i,z_i)$ the location ID of device i to be evaluated. For devices which know their estimated location (green) denote it by $(A_i,B_i,C_i)$. Also denote by $D_{ij}$ distance between devices i and j.

Thus the following set on square inequalities may be established:

$$\frac{x_i}{evaluated} = \frac{A_i}{estimated}, y_i = B_i, z_i = C_i,$$

for each device i which "knows" its location. And $$\underbrace{(x_i - x_j)^2 + (y_i - y_j)^2 + (z_i - z_j)^2}_{evaulated} = \underbrace{D_{ij}^2}_{estimated},$$

for each pair (i, j) with estimated distances.

Determining a solution of this set of inequalities provides possible location(s) of these devices. To minimize the number of possible solutions and find the location precisely the algorithm may account for additional collected data. As a result, a set of constraints is determined which may contain hundreds of equations.

To solve the set of constraints when the number is scaled up, the equations of the polynomial form may be used.

Location ID may not be precise, accordingly relaxation may be used via a simple penalization approach. Equations $V_{estimated} = V_{evaluated}$ may be modified to the penalized form $|V_{estimated} - V_{evaluated}| \leq p$, where p is the penalty for not satisfying initial equations. In particular, the equations of type (1) and (2) are modified by adding the penalty values (see below).

$$-p_{ij}^2 + D_{ij}^2 \leq (x_i - x_j)^2 + (y_i - y_j)^2 + (z_i - z_j)^2 \leq D_{ij}^2 P_{ij}^2.$$

Where for each pair (i, j) with estimated distances, where p and P are penalties for non-satisfaction of lower and upper distance estimations:

$$A - a_i \leq x_i \leq A + a_i, B - b_i \leq y_i \leq B + b_i, C - c_i \leq z_i \leq C + c_i.$$

Where for each device i which knows its location, where a, b, c are penalties for non satisfaction location estimations Estimating solutions for a set of modified inequalities (constraints) is a subject of minimizing sum of penalties $$\sum_{ij} d_{ij} + d_{ij} + \sum_i (a_i + b_i + c_i)$$

where all the penalties are non-negative.

The penalty approach may be modified for selectivity. For example, each GPS receiver permits errors in range 5-25 meters. Thus, in one embodiment no penalty is paid within this range. Alternatively, if the estimation difference from evaluation is significant, then additional punishing penalty policies may be applied.

To apply differential policies a discrete penalization approach may be used. Let $q_1, q_2, \ldots, q_k$ penalty bounds for corresponding to different policies, let $f_1 < f_2 < \ldots < f_k$ be a penalization factor for each bound. Thus each inequality is converted to the following form $$|V_{estimated} - V_{evaluated}| \leq \sum_i p_i,$$

where $p_i \leq q_i$ and $$\sum_i f_i p_i$$

has to be minimized.

Figure 8:
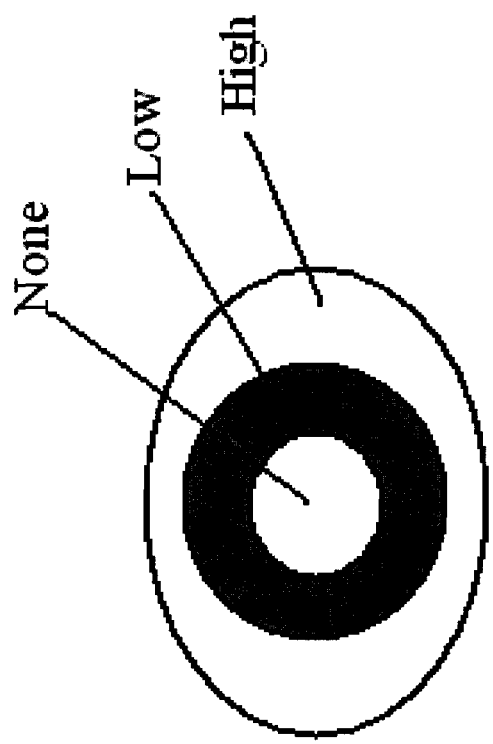
FIG. 8 shows a diagram indicating a discrete penalty policy.

FIG. 8 illustrates a diagram indicating a discrete penalty policy. For example, if $k=3$, $q_1=10$, $q_2=50$, $q_3=\infty$, $p_1=0$, $p_2=1$, $q_3=100$ then the penalty policy may be achieved when the penalty within 10 units is 0, and the penalty which is more than 50 units is 100 times larger than in the "regular" case.

NearLocate is further configured to discover devices providing incorrect estimations. Location IDs for devices that are a predetermined distance away (e.g., >1-2 km) may be removed. Additionally low rated devices may be excluded from calculations as well.

In addition to pruning incorrect estimations may also be eliminated. A random selection of meta-data subset may be selected. The meta-data including information sent from peer devices regarding absolute location and relative distances. When the set containing only valid data is selected, correspondent evaluation is close enough to the actual location. This process may be repeated through multiple iterations. In particular, for penalty based approach an extension to the simple approach may be used to determine incorrect estimations. This may identify estimations that are incidental. Denote by M and m>2 a "big value" and "big power" correspondently. Thus extending each equation with following limits $|V_{estimated} - V_{evaluated}| \leq Mw^m$ where w is the penalty of the equation. Recall that the objective is to minimize the sum of all the penalties.

The heuristic motivation of following approach is following. Since $$\sum_i w_i^m$$

is about the same for all feasible solutions $$\sum_i w_i$$

may be optimized having maximized part of zero valued w-penalties.

Randomized Penalization with Precision Factor Approach

NearLocate may further be configured to randomize penalization with the precision factor. Each device may collect information about topology and the estimations which another devices proceeds. Having set of constraints based on these measures as same as in penalty based approach, a set of non linear equations may be created. The object function in this case corresponds to the sum of precision factors of all devices and has to be maximized.

Synchronized signals, and reverse trilateration using the collection of the points, where even if the power level is not known of the source, the power level at one destination device may be compared against the power levels at the other destination devices, and of which the relative and the absolute positions are known, to determine the absolute and relative position of the source. So in an equilateral triangle, if the power measurements from a synchronized signal are 15, 10, and 5, of the three devices (at each corner of the triangle), you may determine the location of the network point to be closest to the 15, furthest from the 5, and middle-closest to the 10. This helps reverse trilateration.

Reverse trilateration allows a device to precisely determine the location of a Wi-Fi device even though the device does not have awareness of its actual location. Instead the device uses absolute locations of peer devices to trilaterate the Wi-Fi access point. This may be performed, for example by determining refined absolute locations of each device using relative/absolute correlating. This is performed for multiple devices within the system. This may include network points. After determining this information, the system may trilaterate the location of the Wi-Fi access point. So for example, 3-4 devices, record their distances to a network point, and based on their refined absolute positions, the system tri-laterates to calculate the location of the network point. Additional data points may be included in this including power control and timing information.

Non-synchronized signals, may be used this way, assuming that one may estimate the source characteristics, at least as they related to the other devices (i.e. the network point is outputting signals at the same exact power level, or the time stamp of that point is XYZ relative to the arrival for the average case, etc.)

Relative location estimate may provide the necessary location information for solving certain problems. Basics are selected at the beginning and then location evaluated based on precision factor and rating.

To deal with relative position, each device selects the basics for a relative system. Moreover, it distinguishes between numbers of relative systems that are in contact.

When referred to hereafter the phrase "relative location system" includes but is not limited to a set of devices that calculate relative location information. Each relative system has a relative system ID which is randomly selected.

An absolute location system may be seen as a particular case of a relative location system, in this case the system ID is selected to be 1.

A relative location system is established, wherein each device is monitors the network to discover the location relative to other devices. The monitoring can be performed at predetermined intervals or continuously. When no other devices are available, the device randomly selects relative location system ID and sets its own location to $\vec{0}$. Then, the newly added device, which discovered an insufficient number of other devices to set its location precisely within a relative system S, selects any location consistent with the estimation which are available. For example, let C be an origin of a relative system S. Assume that B is newly added device, and the distance from C to B (measured by devices) is d. Thus B may select (0,0,d) as its location, since this location is consistent with all available estimations.

Alternatively, assume that the device A may discover other devices; let $K_1, K_2, \ldots, K_n$ denote the set of all system IDs discovered by communicating with adjacent devices. For each system ID $K_i$, on device A logically created virtual peer $A_{K_i}$ which starts execution of location discovery procedure, when the set of adjacent devices is limited to those which have system ID equals to $K_i$. Applying this approach each device estimates its location for each relative system, when the device which established this system is selected to be an origin.

Let S' and S" be two relative systems. Assume that S' ⊂ S" (i.e. all alive devices forming system S' are included in S"). In S' may not be maintained because this system is subsystem of S".

To ensure the policy when the relative location system, including the largest number of nodes, becomes dominant by eliminating other systems, each device implements following heuristic: if all devices discovered by a device A are included in relative system S' and also in S", the virtual peer responsible for the relative system with lower rating is terminated. Thus the relative system with largest sum of ratings remains active.

The devices may be moved to an absolute location system, based on available information on relative and absolute location collected for each virtual system. The device may store differential information of the relative and absolute and the enhanced absolute location, and refine the absolute or relative information based on interpolation of the differential between an expected value and a calculation of the refined means or standard deviations.

One condition to define transformation from a relative location system S to absolute location system one is that at least three members of the S determine their absolute location. Let $(x_i, y_i, z_i)$ and $(x_i', y_i', z_i')$ denote relative and absolute location of the three devices, i=1,2,3. Solving set of equation of the form:

$$\begin{pmatrix} x_i' \\ y_i' \\ z_i' \end{pmatrix} = T \begin{pmatrix} x_i \\ y_i \\ z_i \end{pmatrix}.$$

Where i=1,2,3 the linear transformation matrix T, which applied on any other devices from S calculates their absolute location. When all alive members of S have calculated their absolute location, then the condition $S \subset S_{absolute}$ holds. Thus all the information "contained" in S is "merged" obtaining the enhanced absolute system.

Figure 9:
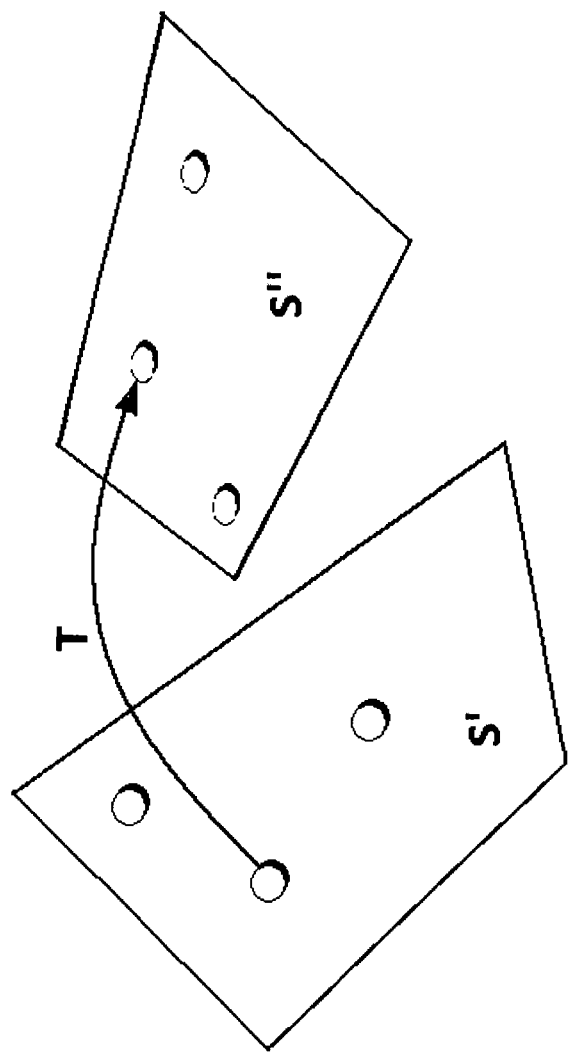
FIGS. 9 and 10 illustrates a transformation from a relative location system to another relative location system.
Figure 10:
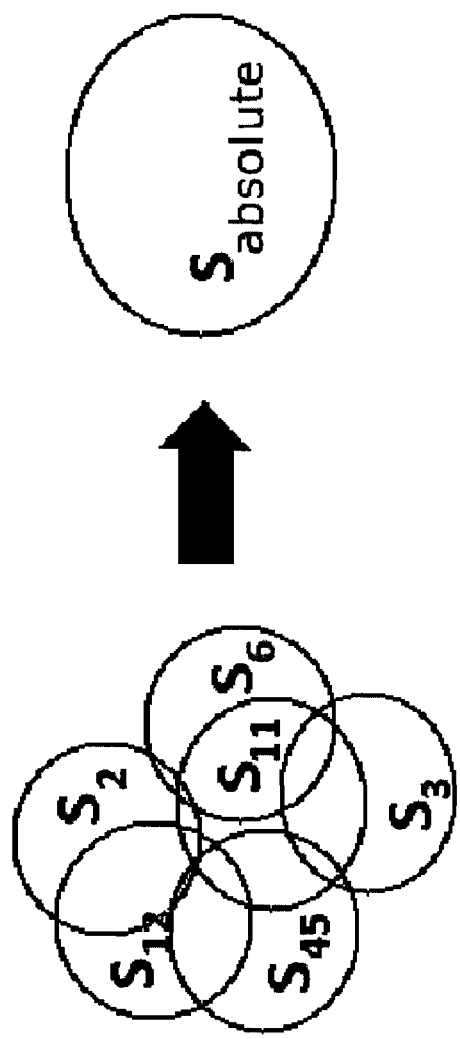

FIG. 9 illustrates a transformation from a relative location system to another relative location system. Generally, the transformation from relative system S' to another relative system S" may be implemented given at least 3 devices having their locations in both systems. Each device continuously monitors the relative location systems discovered, if the condition above holds, then missing locations are evaluated by transformations. The system with highest total rating eliminates other systems, which are included on it as shown in FIG. 10.

Fixed Devices

Figure 11:
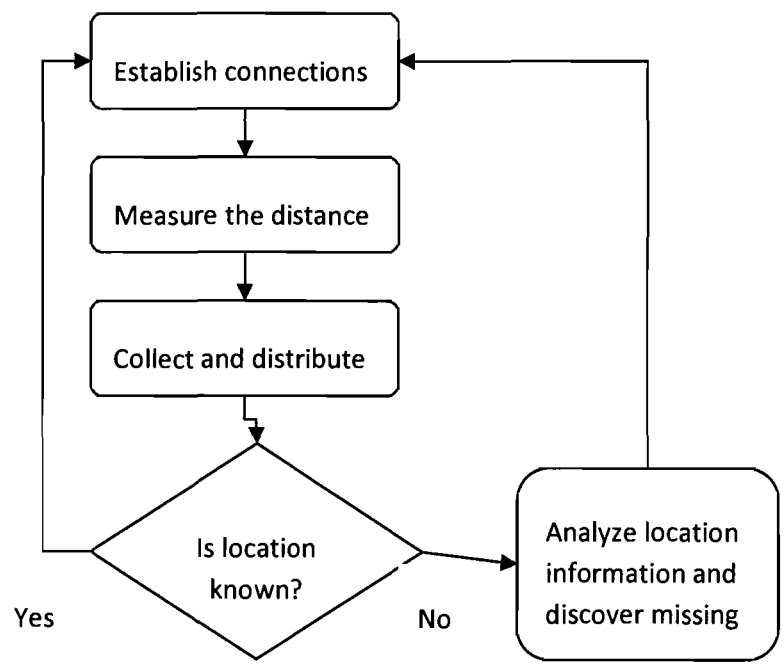
FIG. 11 is a flow diagram showing an iterative method.

NearLocate may be configured to assign each device specialized roles in the location process based on their advantages for certain activities or on other relative differences in their relationship to location calculation process. Once a Location ID is found within a predetermined acceptable range of accuracy, this step may be skipped for further iterations as shown in FIG. 11. Thus for fixed devices more compiled and time consuming techniques may be applied for location ID evaluation.

The devices may also be configured to perform data mining wherein patterns are extracted from data. Methods based on continuous collection of event logs representing locations and movements of all the devices participating in the NearLocate system may be implemented. For example, a centralized approach where all the information may be accommodated on the central server. The server may be implemented as a cluster or cloud of commodity machines, due to the scale of the database which stores logs of all locations around the world: simple estimations show that the upper bound of the size of a database achieves PetaBytes limits.

Using historical event logs collected, the location probability map may be refined.

The location probability map may be generated based on a function m(l,t,ε)→[0,1] which location, time and adjacent neighborhood size returns the probability measure of finding a device in this area.

Given enough historical data collected, this function may be evaluated empirically or predetermined for widely used/accessed locations.

Moreover, movement patterns may be analyzed as well.

A movement probability map may be generated based on a function m'(l,l',t,ε)→[0,1] which given querying and current locations, time and adjacent neighborhood size returns the probability that device which is currently located on l' will move to l.

These measures are then integrated with the embodiments presented herein. For precision factor based approach the rating estimation is multiplied by the coefficient which is proportional to location probability map estimations. In particular, when the movement is detected, this value is also multiplied by the movement probability map estimation.

Alternatively, when the penalty based method is applied thus correspondent penalties derived from these measures are added to the object functions, when locations with highest measures on the maps got lower penalties than other locations with lowest probabilities.

NearLocate may provide a visual map to the user which identifies the each device. The visual map may provide information such as time of last update, or a color coded scheme indicating a device with a low rating. A NearLocate enabled device may be configured to adjust modes wherein, the device may appear as invisible or busy.

The uses of NearLocate may include but are not limited to enterprise, military, and intelligence communities to generate location logical nets, which act in part on the basis of their location with respect to one another. Or to create social networking applications that provide for exact location information for peers, so may do location/schedule synchs or other location-based interactions, not just on the general vicinity but on a pin-pointed basis. NearLocate may also allow users to also geo-tag people on exact location and cross-link to other applications. Vice versa as well when applications may used multiple peer locations for own purposes.

Additionally, a NearLocate enabled device may be configured to use a modified differential location identification method. Wherein after the actual position of a device is determined, the enabled device may calculate the difference between a revised location estimate and a location estimate determined by the network. This may help the device in future instances to use the differential calculation in determining the value of a network generated estimate.

Each device may inherently have a signature, including signal strength, fading, and communication capabilities. The signatures of each device may further be stored in a database. New devices may be compared to known signatures to revise the location estimates additionally dynamic fading information may be generated.

NearLocate enabled devices may further be configured to use a feedback loop for additional refinement of location estimates. For example, a device may refine the location of a stationary device (e.g. WLAN access point) so that it has an exact location. The stationary device's exact location may be used to refine positions for nearby devices.

The probability distribution map may further be configured to include signal fading information. For example, signal fading information for each devices various communication mediums may be stored along with the signatures. Accordingly, NearLocate may dynamically configure the resources that are used to preserve maximum battery life, or enable maximum uplink speeds, or it may be configured to allocate resources based on another criteria.

NearLocate enabled devices may further be configured to perform cross-carrier refinement. In this embodiment, location information from multiple carriers are correlated to produce a further refined probability distribution map. Additionally correlation analysis and refinement of network produces GPS location estimates may also be used by comparing and contrasting them within a group. The use of multiple GPS signals from multiple peers, even when the signals are weak, may be used to further refine the probability distribution map.

Some devices may not have absolute location ID determination capabilities, or sensing (e.g. photo taking capability), in which case those devices can still be included in the calculations, and their location IDs can still be established. The data may have a higher standard deviation due to their reduced location ID abilities (i.e. a non-GPS iPod obtaining and refining its location ID by relating itself to the 3 iPhones nearby, and establishing its absolute location ID, strictly through tri-lateration with the NearVerse system of such iPhones and any second-order devices/network points beyond them.

Figure 12:
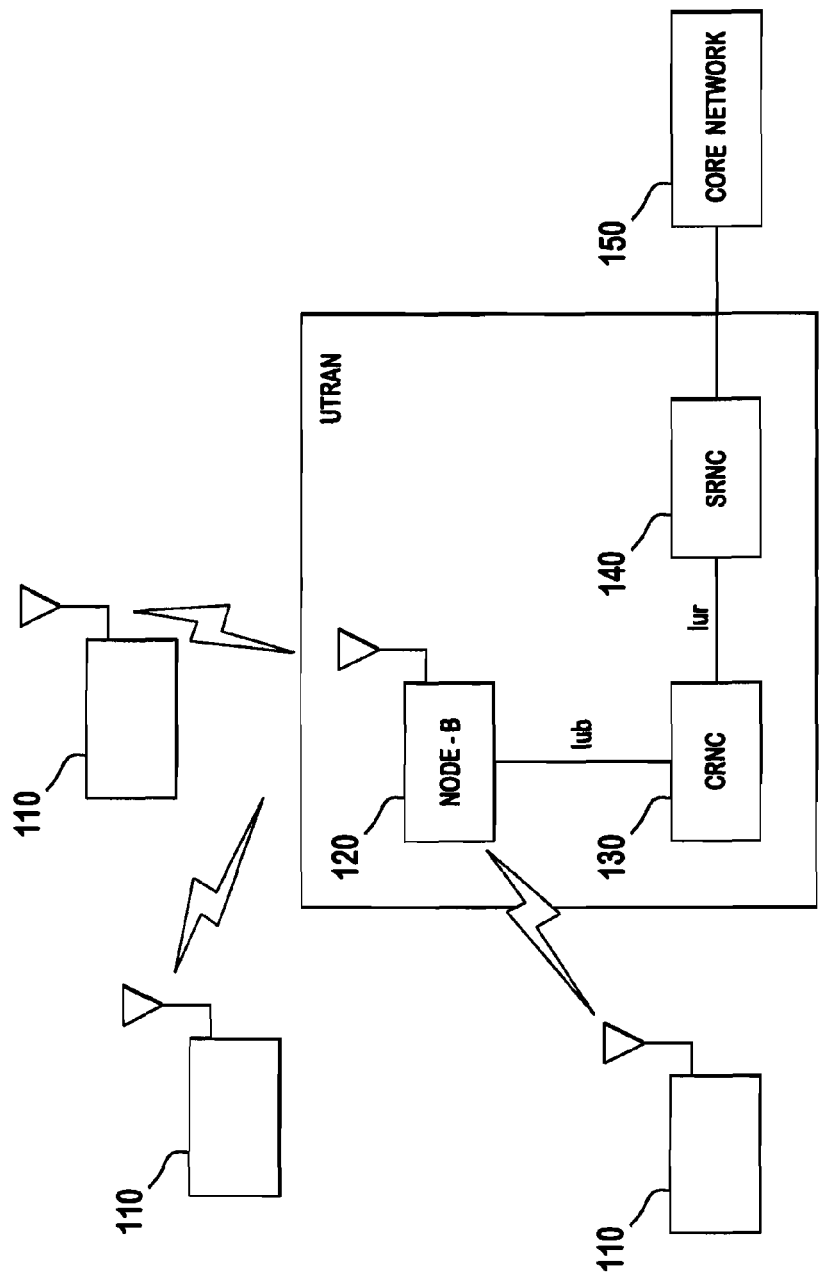
FIG. 12 shows a wireless communication system including a plurality of NearLocate enabled devices.

FIG. 12 shows a wireless communication system including a plurality of NearLocate enabled devices 110, a Node-B 120, a controlling radio network controller (CRNC) 130, a serving radio network controller (SRNC) 140, and a core network 150. The Node-B 120 and the CRNC 130 may collectively be referred to as the UTRAN.

As shown in FIG. 12, the NearLocate enabled devices 110 are in communication with the Node-B 120, which is in communication with the CRNC 130 and the SRNC 140. Although three NearLocate enabled devices 110, one Node-B 120, one CRNC 130, and one SRNC 140 are shown in FIG. 12, it should be noted that any combination of wireless and wired devices may be included in the wireless communication system 100.

Figure 13:
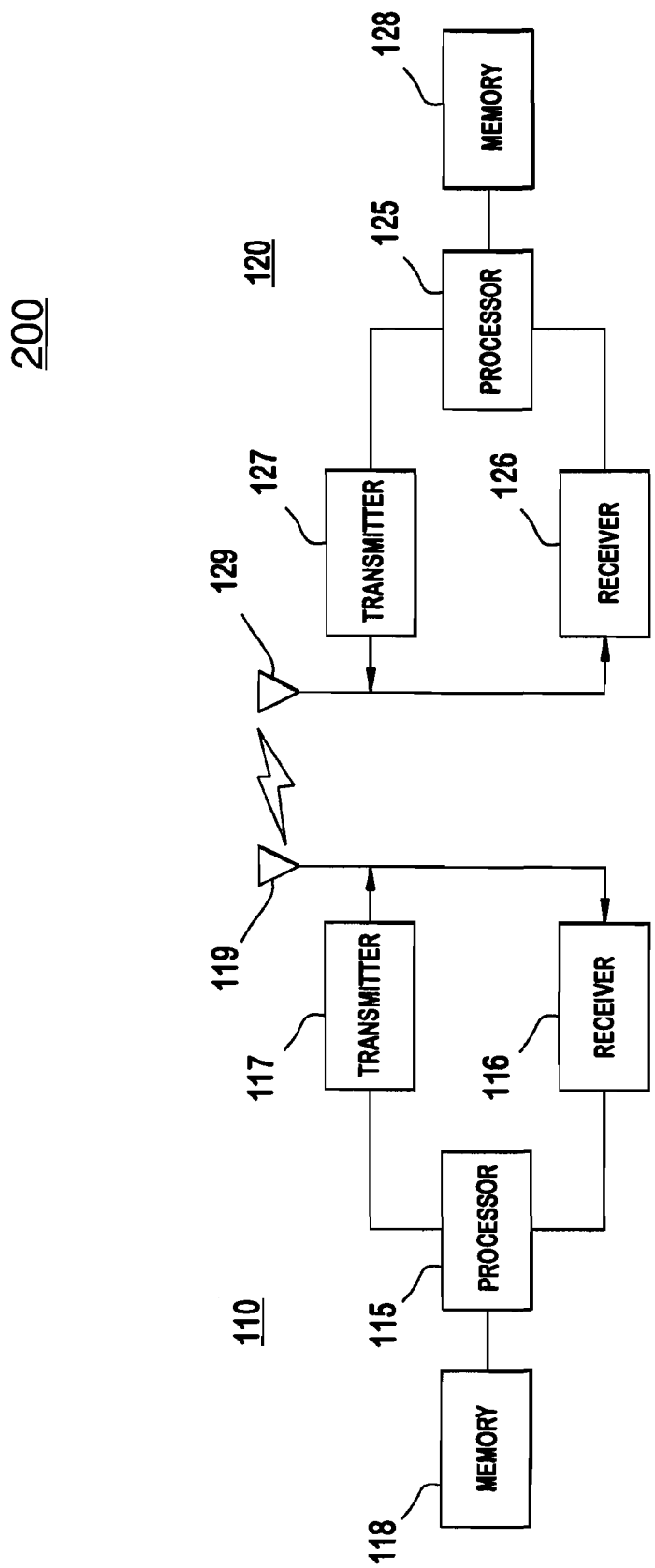
FIG. 13 is a functional block diagram of a NearLocate enabled devices.

FIG. 13 is a functional block diagram of a NearLocate enabled devices 110 and the Node-B 120 of the wireless communication system of FIG. 12. As shown in FIG. 13, the NearLocate enabled devices 110 is in communication with the Node-B 120 and both are configured to perform any of the methods described herein.

In addition to the components that may be found in a typical NearLocate enabled devices, the NearLocate enabled devices 110 includes a processor 115, a receiver 116, a transmitter 117, a memory 118 and an antenna 119. The memory 118 is provided to store software including operating system, application, etc. The processor 115 is provided to perform, alone or in association with the software, any of the methods described herein. The receiver 116 and the transmitter 117 are in communication with the processor 115. The antenna 119 is in communication with both the receiver 116 and the transmitter 117 to facilitate the transmission and reception of wireless data.

In addition to the components that may be found in a typical Node-B, the Node-B 120 includes a processor 125, a receiver 126, a transmitter 127, a memory 128 and an antenna 129. The processor 125 is configured to perform any of the methods described herein. The receiver 126 and the transmitter 127 are in communication with the processor 125. The antenna 129 is in communication with both the receiver 126 and the transmitter 127 to facilitate the transmission and reception of wireless data.

EMBODIMENTS

1. A method comprising:
enhancing location identity through incorporation of at least one short range communication medium.

2. The method of embodiment 1, further comprising using relationships between a plurality of short range communication devices.

3. The method as in any preceding embodiment further comprising correlating the relationships between the plurality of short range communication devices.

4. The method as in any preceding embodiment further comprising correlating the relationships between the plurality of short range devices with at least one long range device.

5. The method as in any preceding embodiment wherein the long range device is a global positioning system (GPS) device.

6. The method as in any preceding embodiment further comprising correlating relationships through meshing to an objection that has a precise location identity.

7. The method as in any preceding embodiment further comprising correlating relationships to maps of physical spaces.

8. The method as in any preceding embodiment further comprising sensing proximity to nearby objections.

9 The method as in any preceding embodiment further comprising capturing relationships between adjacent objects, target objects, through radio frequency sensing.

10. The method as in any preceding embodiment further comprising converting the relationship into likelihood representations of implied physical relationships.

11. The method as in any preceding embodiment further comprising calculating an expected value and rage for potential deviation for adjacent objects and target objects.

12. The method as in any preceding embodiment further comprising enhancing social networking applications.

13. The method as in any preceding embodiment further comprising enhancing shopping using navigation features.

14. The method as in any preceding embodiment further comprising mapping the inside of a building.

15. The method of any preceding embodiment wherein a communication device utilizes at least one of 4G, WiMax, LTE, 3G, HSPA, HSDPA, HSUPA, WCDMA, EVDO, EDGE, GPRS, GSM, CDMA1X, Wi-Fi, Bluetooth, UWB, ZigBee, infrared, DSRC, NFC, IEEE 802.11, WAP, TCP/IP, UDP/IP, satellite, mobile satellite, wireless USB, USB, Ethernet, Cable, Fiber or DSL.

16. A system implementing the method of any preceding embodiment.

17. A device for use in any preceding embodiment.

18. A device of embodiment 17 wherein the device is a wireless device.

19. A device of embodiment 17 wherein the device is a wired device.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

What is claimed is:

1. A method for locating a first device by a processing device, the method comprising:

providing a positional relationship estimate between each of a population of neighboring mobile devices and the first device; wherein the positional relationship estimate is derived from data acquired by either the first device or the respective neighboring device; wherein the positional relationship estimate includes an inference of a position of first device in relation to the respective neighboring device; wherein a population includes one or more neighboring mobile devices;

providing location estimates for each of the population of neighboring mobile devices using location determinations that do not rely on use of positional relationship estimates between each of a population of neighboring mobile devices and the first device;

assigning a precision factor to at least one of the provided neighboring mobile devices' location estimates or the provided positional relationship estimates;

assigning a weight to at least one of the provided neighboring mobile devices' location estimates or the provided positional relationship estimates based on the respective precision factor; and deriving, by the processing device, a location estimate for the first device, through multilateration using the provided neighboring mobile devices' location estimates and the provided positional relationship estimates; wherein the location estimate derivation weighs the location estimate of at least one neighboring mobile device or at least one positional relationship estimate by the assigned weight.

2. The method of claim 1 wherein multilateration includes use of the location estimates and positional relationship estimates of only one neighboring mobile device.

3. The method of claim 1 further comprising providing a location estimate for the first device and producing, by the processing device, a refined location estimate of the first device using the derived location estimate for the first device and the location estimate of the first device.

4. The method of claim 3 wherein the refinement of the location estimate for the device is performed iteratively by deriving interim refined location estimates to converge on a final refined location estimate.

5. The method of claim 4 wherein the iteratively refined location estimate is considered final, once a predetermined level of precision is achieved.

6. The method of claim 3 wherein the location estimate for at least one neighboring mobile device is derived through multilateration of location estimates and the positional relationship estimates of other neighboring devices or the first device.

7. The method of claim 3 wherein the refinement of the location estimate further uses a comparison of the location estimates and positional relationship estimates with a map or blueprint that identifies physical objects.

8. The method of claim 1 further comprising comparing sensing information from the neighboring mobile device and the first device to determine whether the neighboring mobile device and the first device are sensing a same thing; wherein at least one positional relationship estimate is based on the sensing information comparison.

9. The method of claim 1 further comprising positional relationship estimates from and to a neighboring device having a fixed location or previously deterministically estimated location.

10. A processing device for locating a first device, the processing device comprising:

a processor configured to provide a positional relationship estimate between each of a population of neighboring mobile devices and the first device; wherein the positional relationship estimate is derived from data acquired by either the first device or the respective neighboring device; wherein the positional relationship estimate includes an inference of a position of first device in relation to the respective neighboring device; wherein a population includes one or more neighboring mobile devices;

the processor is further configured to provide location estimates for each of the population of neighboring mobile devices using location determinations that do not rely on use of positional relationship estimates between each of a population of neighboring mobile devices and the first device;

the processor is further configured to derive a location estimate for the first device, through multilateration using the provided neighboring mobile devices' location estimates and the provided positional relationship estimates; and the processor is further configured to be provided a location estimate for the first device and to produce a refined location estimate of the first device using the derived location estimate for the first device and the location estimate of the first device; wherein the refinement of the location estimate for the device is performed iteratively by deriving interim refined location estimates to converge on a final refined location estimate; wherein the iteratively refined location estimate is considered final, once a predetermined level of precision is achieved.

11. The processing device of claim 10 wherein multilateration includes use of the location estimates and positional relationship estimates of only one neighboring mobile device.

12. A processing device for locating a first device, the processing device comprising:

a processor configured to provide a positional relationship estimate between each of a population of neighboring mobile devices and the first device; wherein the positional relationship estimate is derived from data acquired by either the first device or the respective neighboring device; wherein the positional relationship estimate includes an inference of a position of first device in relation to the respective neighboring device; wherein a population includes one or more neighboring mobile devices;

the processor is further configured to provide location estimates for each of the population of neighboring mobile devices using location determinations that do not rely on use of positional relationship estimates between each of a population of neighboring mobile devices and the first device;

the processing device is further configured to assign a precision factor to at least one of the provided neighboring mobile devices' location estimates or the provided positional relationship estimates;

the processing device is further configured to assign a weight to at least one of the provided neighboring mobile devices' location estimates or the provided positional relationship estimates based on the respective precision factor; and the processor is further configured to derive a location estimate for the first device, through multilateration using the provided neighboring mobile devices' location estimates and the provided positional relationship estimates; wherein the location estimate derivation weighs the location estimate of at least one neighboring mobile device or at least one positional relationship estimate by the assigned weight.

13. The processing device of claim 12 wherein multilateration includes use of the location estimates and positional relationship estimates of only one neighboring mobile device.

14. The processing device of claim 12 wherein the processing device is further configured to provide a location estimate for the first device and to produce a refined location estimate of the first device using the derived location estimate for the first device and the location estimate of the first device.

15. A method for locating a first device by a processing device, the method comprising:

providing a positional relationship estimate between each of a population of neighboring mobile devices and the first device; wherein the positional relationship estimate is derived from data acquired by either the first device or the respective neighboring device; wherein the positional relationship estimate includes an inference of a position of first device in relation to the respective neighboring device; wherein a population includes one or more neighboring mobile devices;

providing location estimates for each of the population of neighboring mobile devices using location determinations that do not rely on use of positional relationship estimates between each of a population of neighboring mobile devices and the first device;

deriving, by the processing device, a location estimate for the first device, through multilateration using the provided neighboring mobile devices' location estimates and the provided positional relationship estimates; and providing a location estimate for the first device and producing, by the processing device, a refined location estimate of the first device using the derived location estimate for the first device and the location estimate of the first device; wherein the refinement of the location estimate for the device is performed iteratively by deriving interim refined location estimates to converge on a final refined location estimate; wherein the iteratively refined location estimate is considered final, once a predetermined level of precision is achieved.

16. The method of claim 15 wherein multilateration includes use of the location estimates and positional relationship estimates of only one neighboring mobile device.

17. The method of claim 15 further comprising: assigning a precision factor to at least one of the provided neighboring mobile devices' location estimates or the provided positional relationship estimates; assigning a weight to at least one of the provided neighboring mobile devices' location estimates or the provided positional relationship estimates based on the respective precision factor; and wherein the location estimate derivation weighs the location estimate of at least one neighboring mobile device or at least one positional relationship estimate by the assigned weight.

18. The method of claim 15 further comprising comparing sensing information from the neighboring mobile device and the first device to determine whether the neighboring mobile device and the first device are sensing a same thing; wherein at least one positional relationship estimate is based on the sensing information comparison.

19. The method of claim 15 further comprising positional relationship estimates from and to a neighboring device having a fixed location or previously deterministically estimated location.

20. The method of claim 15 wherein the location estimate for at least one neighboring mobile device is derived through multilateration of location estimates and the positional relationship estimates of other neighboring devices or the first device.

21. The method of claim 15 wherein the refinement of the location estimate further uses a comparison of the location estimates and positional relationship estimates with a map or blueprint that identifies physical objects.

22. The method of claim 15 wherein the derived location estimate uses a mean and an expected deviation of the location estimates of at least one neighboring mobile devices or at least one positional relationship estimate.

* * * * *